United States Patent
Ozaki et al.

(10) Patent No.: US 6,357,519 B1
(45) Date of Patent: Mar. 19, 2002

(54) COMPOUND HEAT EXCHANGER HAVING TWO CORES

(75) Inventors: Tatsuo Ozaki, Okazaki; Satomi Muto, Nishikasugai-gun; Takaaki Sakane, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/660,072

(22) Filed: Sep. 12, 2000

(30) Foreign Application Priority Data

Sep. 29, 1999 (JP) .......................................... 11-276939

(51) Int. Cl.[7] .............................. F28D 7/10; F28D 1/00; F28F 13/00
(52) U.S. Cl. ........................ 165/140; 165/135; 165/148; 165/149
(58) Field of Search ................................ 165/140, 135, 165/148, 149

(56) References Cited

U.S. PATENT DOCUMENTS

| | | | | |
|---|---|---|---|---|
| 3,246,691 A | * | 4/1966 | La Porte et al. | ............ 165/151 |
| 5,000,257 A | * | 3/1991 | Shinmura | .................... 165/140 |
| 5,509,199 A | * | 4/1996 | Beamer et al. | ............. 165/140 |
| 5,535,819 A | * | 7/1996 | Matsuura | .................... 165/149 |
| 5,975,197 A | * | 11/1999 | Kado | ........................... 165/149 |
| 6,170,565 B1 | * | 1/2001 | Nishishita | .................... 165/140 |
| 6,189,603 B1 | * | 2/2001 | Sugimoto et al. | ........... 165/140 |

FOREIGN PATENT DOCUMENTS

JP U4-115281 10/1992

\* cited by examiner

*Primary Examiner*—Henry Bennett
*Assistant Examiner*—Tho Van Duong
(74) *Attorney, Agent, or Firm*—Harness, Dickey & Pierce, PLC

(57) ABSTRACT

Two heat exchangers, such as a condenser for cooling refrigerant circulating in an air-conditioner and a radiator for cooling coolant in an internal combustion engine, are combined into a single unit. Both heat exchangers are overlapped in an airflow direction of cooling air. Each heat exchanger has a similar structure composed of a core having plural tubes and fins and a pair of header tanks connected to both ends of the tubes. Two heat exchanges are combined by a side plate disposed on the upper side thereof. The openings of both header tanks are closed with separately formed tank caps and are connected to the side plate through the tank caps. Direct heat transfer from one header tank to the other header tank, e.g., from the radiator tank to the condenser tank, is prevented because both header tanks are connected to the side plate through separate tank caps, thus achieving a high heat radiation capacity in the compound heat exchanger.

7 Claims, 9 Drawing Sheets

COMPOUND HEAT EXCHANGER HAVING TWO CORES

CROSS-REFERENCE TO RELATED APPLICATION

This application is based upon and claims benefit of priority of Japanese Patent Application No. Hei-11-276939 filed on Sep. 29, 1999, the content of which is incorporated herein by reference.

BACKGROUND OF THE INVENTION

1. Field of the Invention

The present invention relates to a compound heat exchanger having plural heat exchanger cores, and more particularly to a compound heat exchanger having a condenser core for cooling refrigerant in an air-conditioning system and a radiator core for cooling coolant of an internal combustion engine. The compound heat exchanger is suitably used in an automobile vehicle.

2. Description of Related Art

An example of a compound heat exchanger having a condenser core and a radiator core is disclosed in JP-U-4-15281. In this compound heat exchanger, the condenser core and the radiator core are connected into a single unit by an integrally formed member having a condenser header tank cap and a radiator header tank cap. The condenser header tank cap closes an open end of the condenser header tank connected to the condenser core, while the radiator header tank cap closes an open end of the radiator header tank connected to the radiator core.

In the conventional compound heat exchanger disclosed in the above publication, heat in the radiator header tank is transferred to the condenser header tank through the integrally formed member because both header tanks are connected by the integrally formed member. Therefore, the refrigerant in the condenser header tank is heated by the heat transferred from the radiator header tank, and thereby a heat radiation capacity of the condenser core decreases.

SUMMARY OF THE INVENTION

The present invention has been made in view of the above-mentioned problem, and an object of the present invention is to provide an improved compound heat exchanger in which the heat transfer between two header tanks is suppressed and a high heat radiation capacity is realized.

The compound heat exchanger includes a first heat exchanger such as a condenser for cooling refrigerant circulating in an air-conditioner and a second heat exchanger such as a radiator for cooling coolant in an internal combustion engine. The first and the second heat exchangers are overlapped on each other in an airflow direction of cooling air. Both heat exchangers have a similar structure, that is, each heat exchanger is composed of a core having plural tubes and fins and a pair of header tanks connected to both ends of the tubes. Both cores are connected to each other by a side plate disposed on the top of both cores, so that at least a top fin of one of the cores, preferably both top fins, contacts the side plate in heat conductive relation. Preferably, a pair of fins for both cores is formed as a unitary part, and each header tank is formed by connecting two separate elongate cup-shaped or L-shaped parts.

Upper openings of both header tanks are closed with respective tank caps that are connected to the side plate. After all the components, header tanks, cores, tank caps and the side plate are assembled together, the compound heat exchanger is connected into single unit by a brazing process. Since both tank caps are separate from each other, though they are connected to the common side plate, heat in one header tank is not directly transferred to the other header tank. For example, most heat in the radiator header tank is transferred to the side plate via its tank cap and is radiated from the side plate and the fin contacting the side plate. Accordingly, the radiation capacity is not much decreased by combining two heat exchangers.

Preferably, positioning walls and side walls are formed on the side plate to fix the tank caps at correct positions and thereby to prevent the header tanks from being positioned with slanted angles relative to the cores. The tank caps are inserted and held between the positioning and side walls of the side plate when assembled, and then the tank caps and the side plate are firmly connected by brazing.

Both tank caps may be made as a single part having cap portions and connecting portions, as long as two cap portions are separated from each other with a certain space therebetween. Alternatively, both tank caps may be formed integrally with the side plate, with cap portions being positioned separately form each other. Further, one of the tank caps may be formed integrally with the side plate, while the other one is separately made and connected to the side plate by brazing. Both tank caps may be integrated with a mounting bracket via connecting portions with cap portions being positioned separately from each other.

According to the present invention, the heat in one header tank is not directly transferred to the other header tank, and therefore a high radiation capacity in the combined heat exchanger is realized.

Other objects and features of the present invention will become more readily apparent from a better understanding of the preferred embodiments described below with reference to the following drawings.

DETAILED DESCRIPTION OF THE PREFERRED EMBODIMENTS

Figure 1:
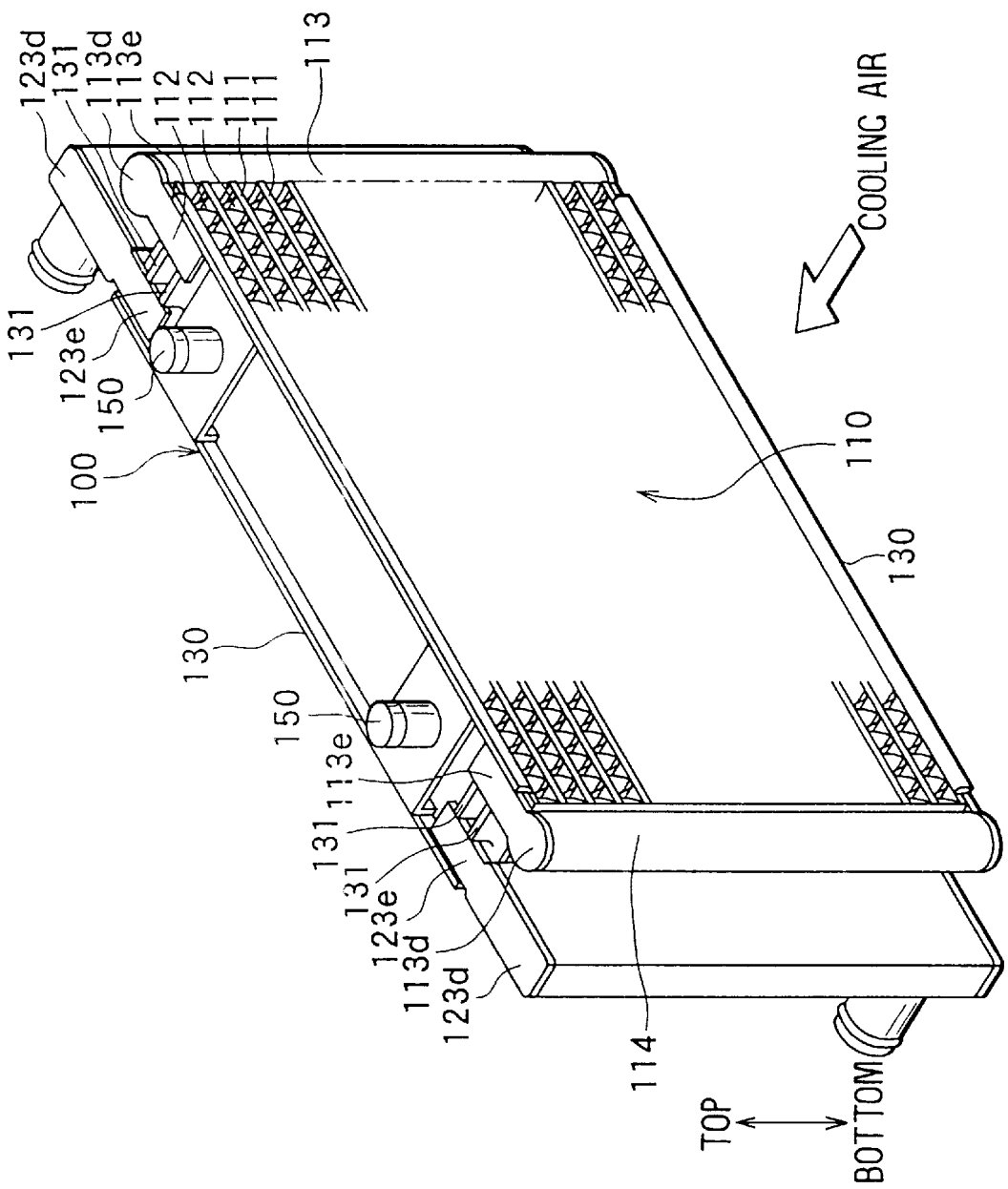
FIG. 1 is a perspective view showing a compound heat exchanger as a first embodiment of the present invention, viewed from a front side from which cooling air is supplied.
Figure 2:
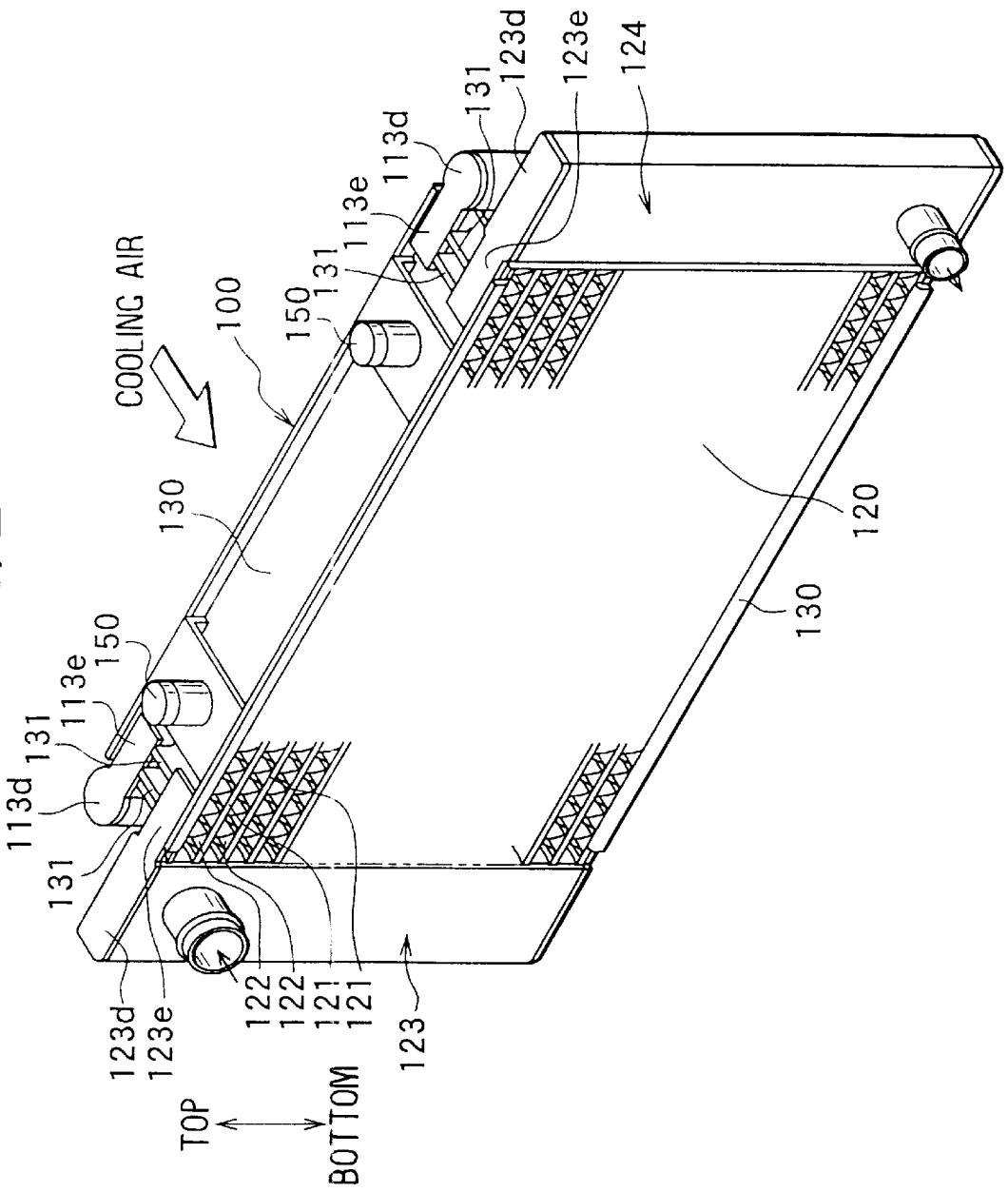
FIG. 2 is perspective view showing the same compound heat exchanger as shown in FIG. 1, viewed from a rear side thereof.

A first embodiment of the present invention will be described with reference to FIGS. 1–7. An entire structure of a compound heat exchanger 100 is shown in FIGS. 1 and 2. FIG. 1 shows a perspective view of the compound heat exchanger 100, viewed from the front side from which cooling air is supplied. FIG. 2 shows the compound heat exchanger, viewed from the rear side. A radiator for cooling coolant in an internal combustion engine and a condenser for cooling refrigerant in an air-conditioning system of an automobile vehicle are combined into a single unit as a compound heat exchanger 100. The condenser is overlapped on the front surface of the radiator, so that cooling air is supplied to the condenser first and then flows through the radiator.

The condenser is composed of: a condenser core 110 having condenser tubes 111 and condenser fins 112; and a pair of condenser header tanks 113, 114 connected to both sides of the core 110, as shown in FIG. 1. In the condenser core 110, plural aluminum tubes 111 are horizontally disposed between two header tanks 113, 114, and wave-shaped aluminum fins 112 are inserted and connected between tubes 111. The refrigerant in the right side header tank 113 is distributed to the tubes 111 and flows therethrough toward the left side header tank 114. The left side header tank 114 collects the refrigerant flowing through the tubes 111. The fins 112 expedite heat exchange between the refrigerant and the cooling air.

Figure 3:
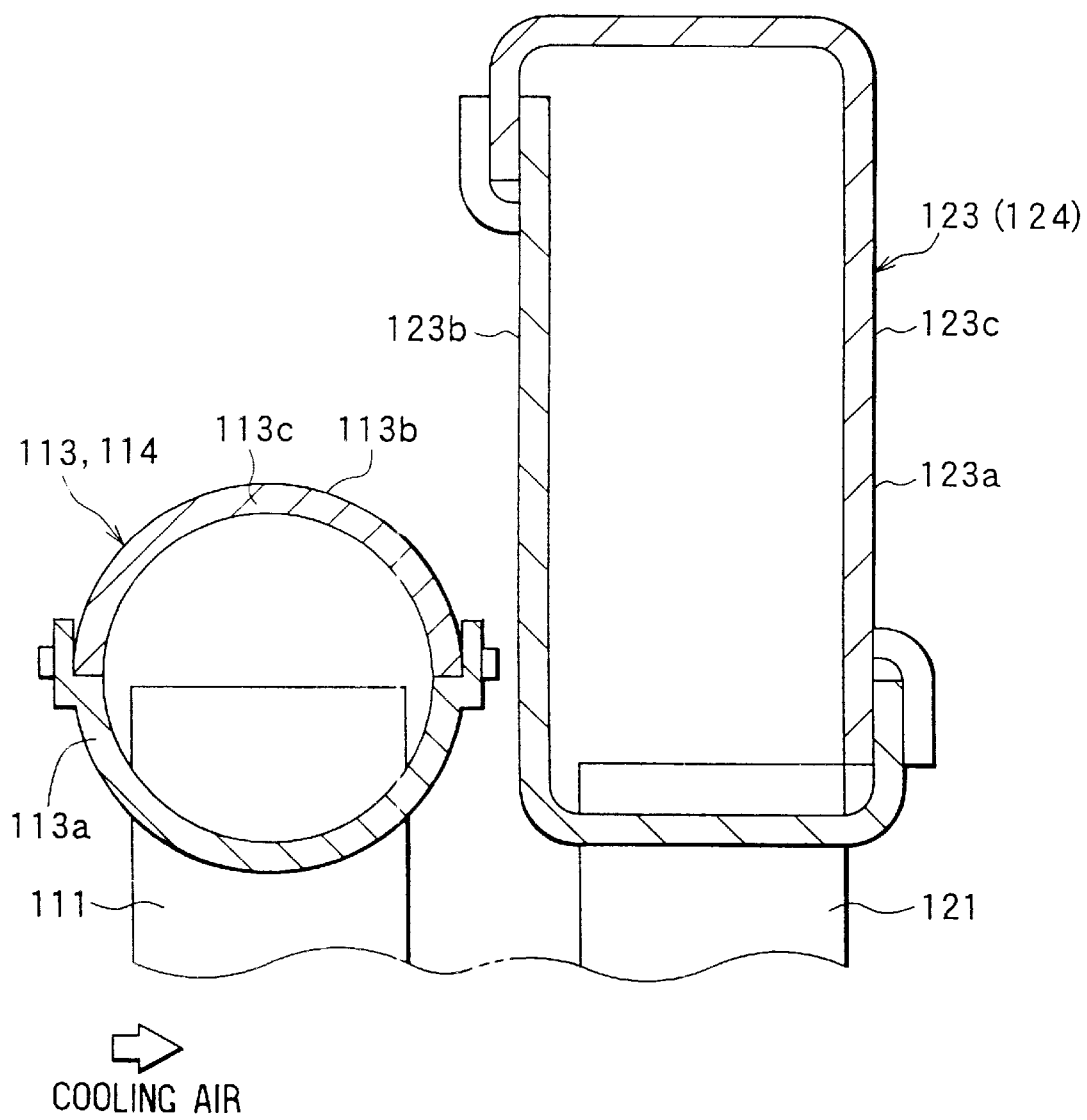
FIG. 3 is a partial cross-sectional view of the compound heat exchanger, showing a condenser header tank and a radiator header tank.

As shown in FIG. 3, a condenser header tank body 113b is formed by connecting a cup-shaped elongate condenser core plate 113a and a similarly shaped condenser core plate cover 113c. The condenser header tank body 113b is vertically disposed, and an end of the horizontally disposed condenser tubes 111 is open inside the header tank body 113b, so that the refrigerant communicates between the header tank body 113b and the tubes 111. Both longitudinal ends of the header tank body 113b are closed with the header tank caps 113d.

As shown in FIG. 2 the radiator is composed of: a radiator core 120 having radiator tubes 121 and radiator fins 122; and a pair of radiator header tanks 123, 124 connected to both sides of the core 120. In the radiator core 120, plural aluminum tubes 121 are horizontally disposed between two header tanks 123, 124, and wave-shaped aluminum fins 122 are inserted and connected between tubes 121. The coolant, such as water, in the left side header tank 123 is distributed to the tubes 121 and flows therethrough toward the right side header tank 124. The right side header tank 124 collects the coolant flowing through the tubes 121. The fins 122 expedite heat exchange between the coolant and the cooling air.

As shown in FIG. 3, a radiator header tank body 123c is formed by connecting an L-shaped tank plate 123a and another L-shaped tank plate 123b. The radiator header tank body 123c is vertically disposed, and an end of the horizontally disposed radiator tubes 121 is open inside the header tank body 123c, so that the coolant communicates between the header tank body 123c and the tubes 121. Both longitudinal ends of the header tank body 123c are closed with the header tank caps 123d.

Figure 4:
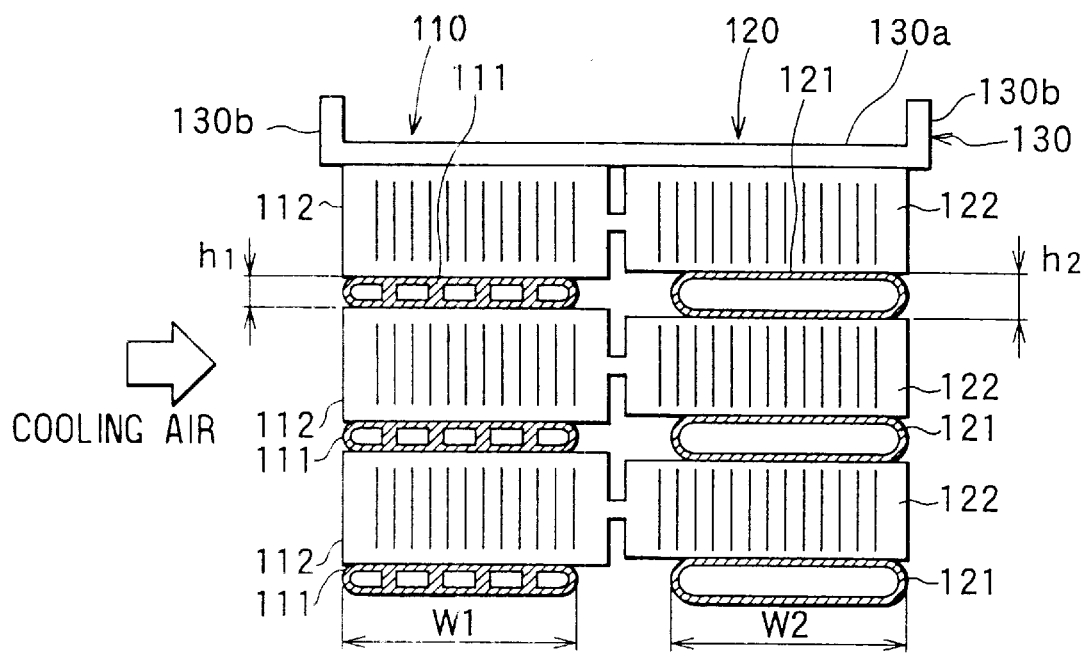
FIG. 4 is a partial cross-sectional view of the compound heat exchanger, showing laminated tubes and fins.

As shown in FIG. 4, the condenser core 110 and the radiator core 120 are formed in a unitary body. That is, the condenser fins 112 and the radiator fins 122 are integrally formed, and a side plate 130 supports both the condenser core 110 and the radiator core 120, the integrally formed fins 112, 122 being in contact with the side plate 130. The side plate 130 is angled upward to form side walls 130b at its both sides. The condenser tube 111 is formed by extrusion or drawing into a flat-oval shape having plural through-passages therein. The radiator tube 121 is also formed into a flat-oval shape having a single through-passage therein. A short diameter h2 of the radiator tube 121 is larger than a short diameter h1 of the condenser tube 111, and a long diameter W2 of the radiator tube 121 is substantially equal to a long diameter W1 of the condenser tube 111. Both tubes 111, 121 are positioned in the cores 110, 120, so that the long diameter of both tubes 111, 121 lies in parallel to the flow direction of the cooling air.

All the components forming the condenser and the radiator, i.e., the tubes 111, 121, the fins 112, 122, the header tanks 113, 114, 123, 124, the tank caps 113d, 123d, and the side plate 130, are brazed in a furnace to form a single unit after they are all assembled. The brazing is performed under a known NOCOLOK brazing method. That is, after a flux for removing an oxidized film from brazing-material-clad-aluminum is coated, the components are brazed in a furnace under an inert gas ambient.

Figure 5:
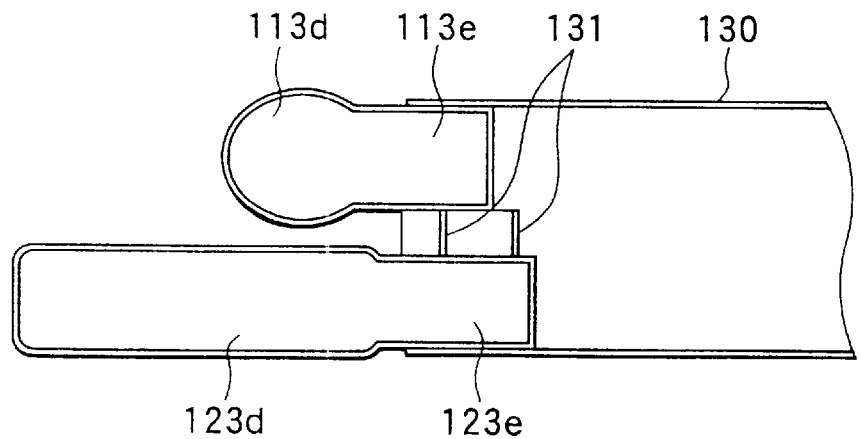
FIG. 5 is a partial top view of the compound heat exchanger, showing a portion including header tank caps and a side plate.
Figure 6A:
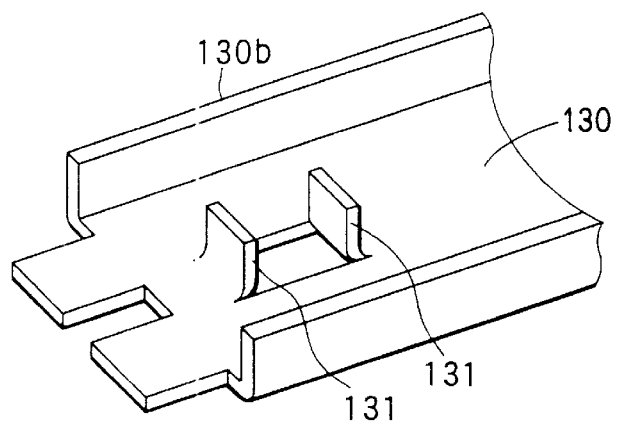
FIG. 6A is a perspective view showing a side plate having walls for positioning the header tank caps.
Figure 6B:
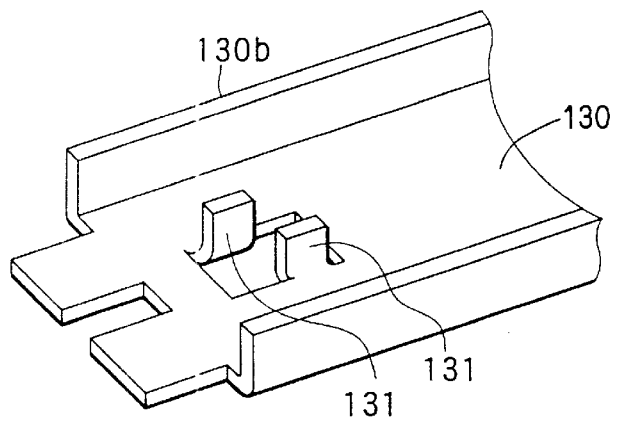
FIGS. 6B and 6C are perspective views respectively showing modified forms of the positioning walls shown in FIG. 6A.
Figure 6C:
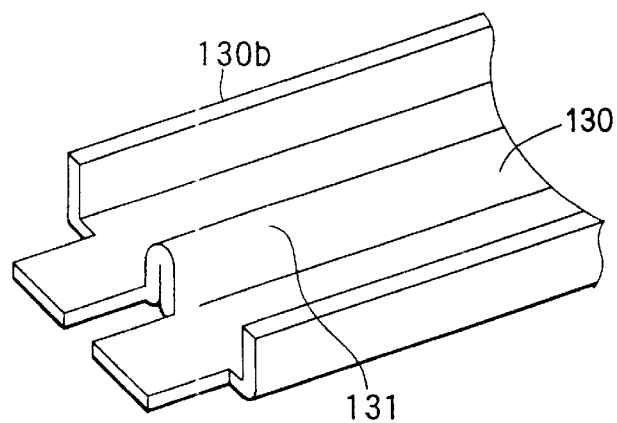
Figure 7:
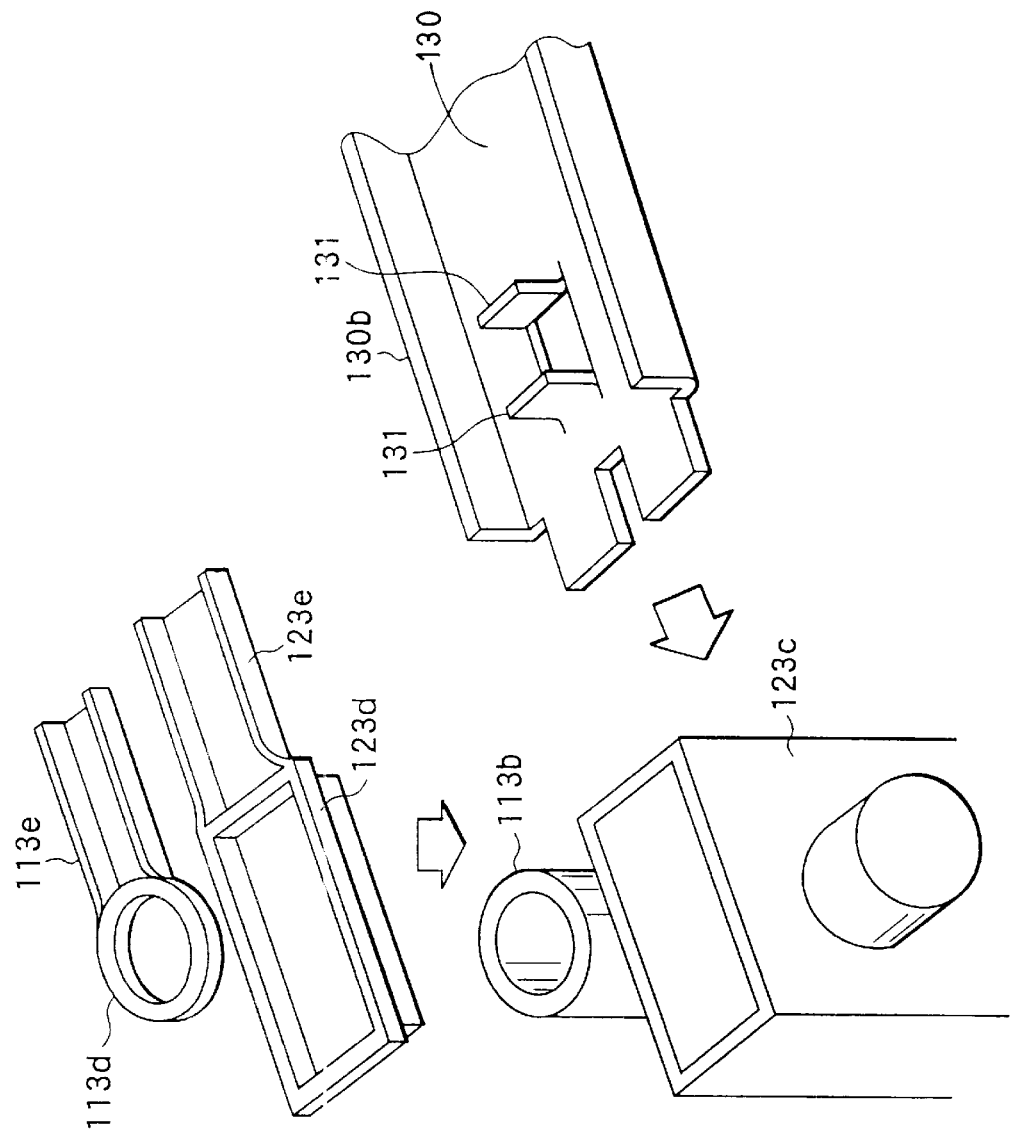
FIG. 7 is a perspective view showing respective directions for assembling header tank bodies, header tank caps and a side plate.

As shown in FIGS. 1, 2 and 5, both tank caps 113d and 123d respectively include connecting portions 113e and 123e that extend toward the side plate 130. Both tank caps 113d, 123d are connected to the side plate 130 by brazing, as shown in FIG. 5. Positioning walls 131 are formed on the side plate 130, as shown in FIG. 6A. Both connecting portions 113e, 123e are inserted between the side walls 130b and the positioning walls 131, as shown in FIG. 7, and thereby the tank caps 113d, 123d are correctly positioned. The tank caps 113d and 123d close the upper openings of the condenser header tank body 113b and the radiator header tank body 123c, respectively. The positioning walls 131 shown in FIG. 6A may be variously modified, for example, to the forms shown in FIGS. 6B and 6C.

The embodiment described above has the following advantages. Since the tank caps 113d and 123d are separately made and then connected to the side pale 130 via the connecting portions 113e and 123e, the heat in the radiator header tanks 123, 124 is not directly transferred to the condenser header tanks 113, 114. Further, the side plate 130 contacts both the condenser fins 112 and the radiator fins 122. Therefore, most heat in the radiator header tanks 123, 124 transferred to the side plate 130 via the radiator header tank caps 123d is radiated from both fins 122, 112. (A large portion of the heat is radiated form the radiator fins 122.) Accordingly, the radiation capacity of the condenser core 110 is not much decreased by the heat transfer from the radiator header tanks 123, 124 to the condenser header tanks 113, 114. In other words, the radiation capacity decrease in the condenser core 110 due to the heat transfer is prevented.

Since both header tank caps 113d and 123d are held by the positioning walls 131 in the side plate 130, the caps do not move relative to the side plate during the brazing process, keeping their correct positions. Further, since both tank caps 113d, 123d are inserted into both header tank bodies 113b, 123c, their positions are correctly kept relative to the side plate 130 without being connected to the side plate 130 with a slated angle during the brazing process. Though each of the header tanks, 113, 114, 123 and 124, is formed by connecting two parts separated along the longitudinal direction, as shown in FIG. 3, it is correctly positioned due to the structure of the header tank caps and the side plate. Accordingly, all the components are firmly and correctly connected in the brazing process, forming the compound heat exchanger 100 having a high mechanical strength.

Figure 8A:
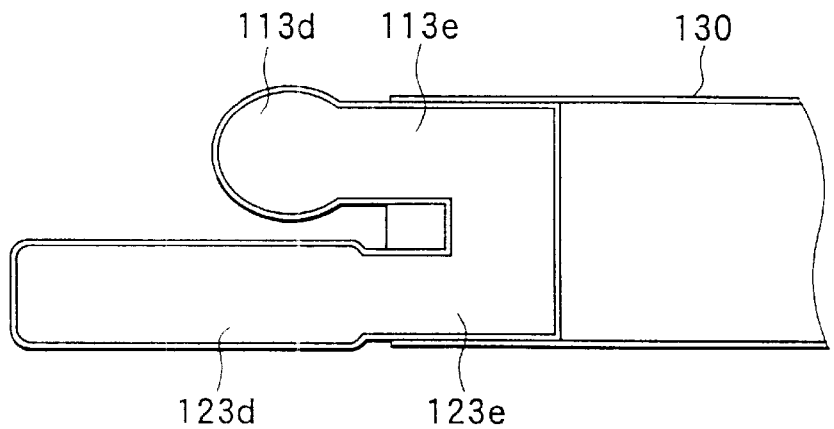
FIG. 8A is a partial top view of the compound heat exchanger as a second embodiment of the present invention, showing a portion including header tank caps and a side plate.
Figure 8B:
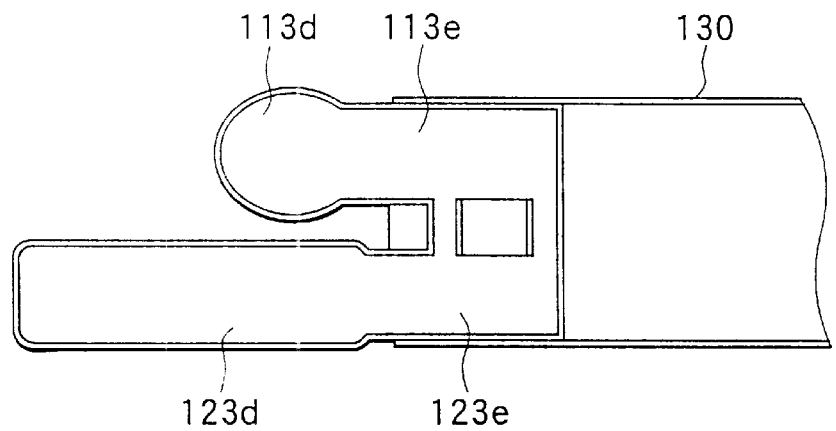
FIG. 8B is a partial top view showing a modified form of the portion shown in FIG. 8A.

A second embodiment of the present invention will be described with reference to FIGS. 8A and 8B. In this embodiment, the condenser header tank cap 113d and the radiator header tank cap 123d are formed as a single unit as shown in FIG. 8A. Both cap portions are separated from each other, but the connecting portions 113e and 123e are connected together and inserted between the side walls 130b of the side plate 130. The positioning walls 131 are eliminated because those are not necessary in this structure. All the components including the header tanks and the caps can be firmly and correctly connected, forming the compound heat exchanger with a high strength. Since the cap portions of both caps 113d, 123d are separated from each other in this embodiment, too, the heat in the radiator header tanks 123, 124 is not directly transferred to the condenser header tanks 113, 114. The combined header tank caps shown in FIG. 8A may be modified to the form shown in FIG. 8B.

Figure 9:
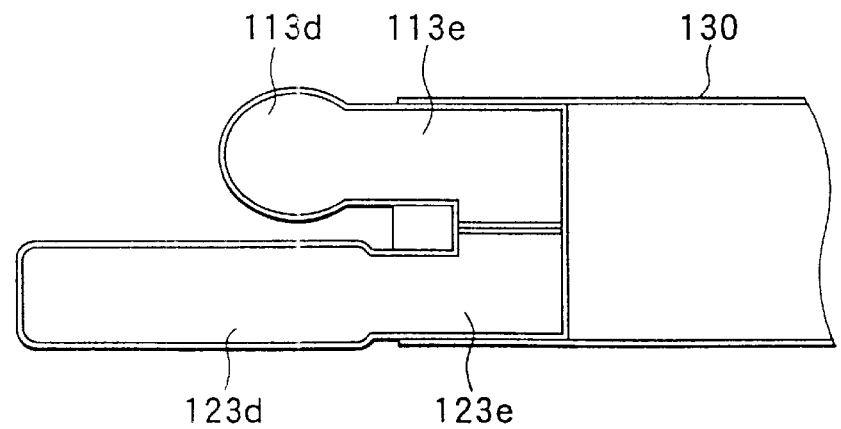
FIG. 9 is a partial top view of the compound heat exchanger as a third embodiment of the present invention, showing a portion including header tank caps and a side plate.

A third embodiment is shown in FIG. 9, in which both header tank caps 113d and 123d are separately formed, and the connecting portions 113e and 123e are inserted between side walls 130b of the side plate 130. Since both connecting portions 113e, 123e are inserted side by side contacting each other, no positioning wall 131 is required.

Figure 10:
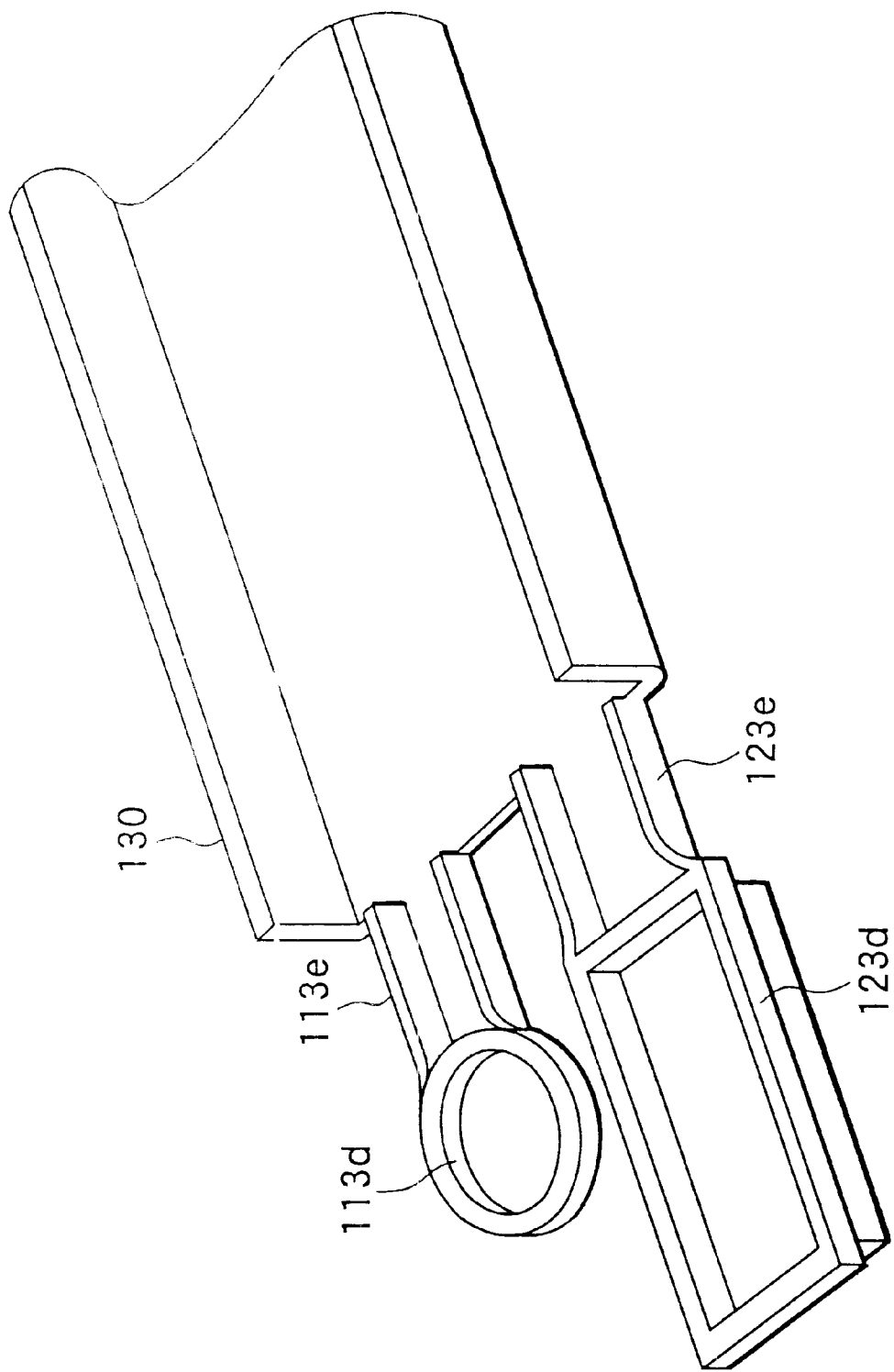
FIG. 10 is a perspective view showing header tank caps integrally formed with a side plate as a fourth embodiment of the present invention.

A fourth embodiment is shown in FIG. 10, in which both header tank caps 113d, 123d are formed integrally with the side plate 130. Both cap portions are separated from each other, but they are connected to the side plate via respective connecting portions 113e, 123e.

Figure 11:
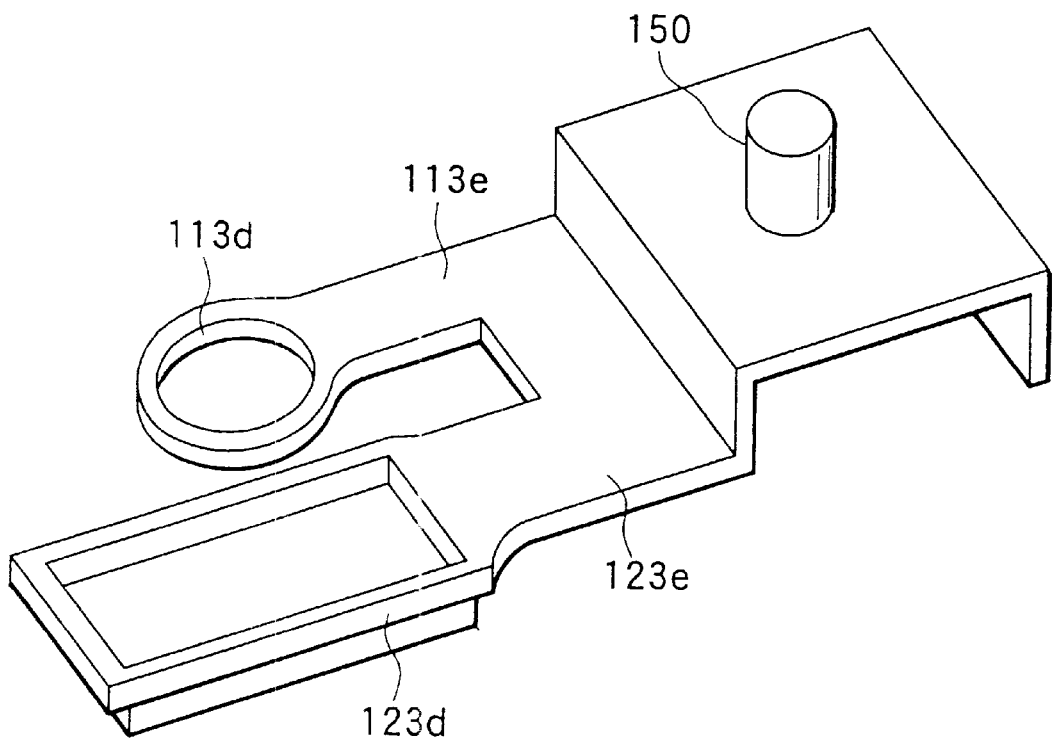
FIG. 11 is a perspective view showing header tank caps formed together with a mounting bracket, as a fifth embodiment of the present invention.

A fifth embodiment is shown in FIG. 11, in which the connecting portions 113e, 123e of both header tank caps 113d, 123d are connected to each other, and a bracket having a pin 150 for mounting both cores 110, 120 on the vehicle is also connected to the connecting portions 113e, 123e. All those portions are formed as a single unit, though the cap portions of both caps 113d, 123d are formed with a separating space therebetween.

Figure 12:
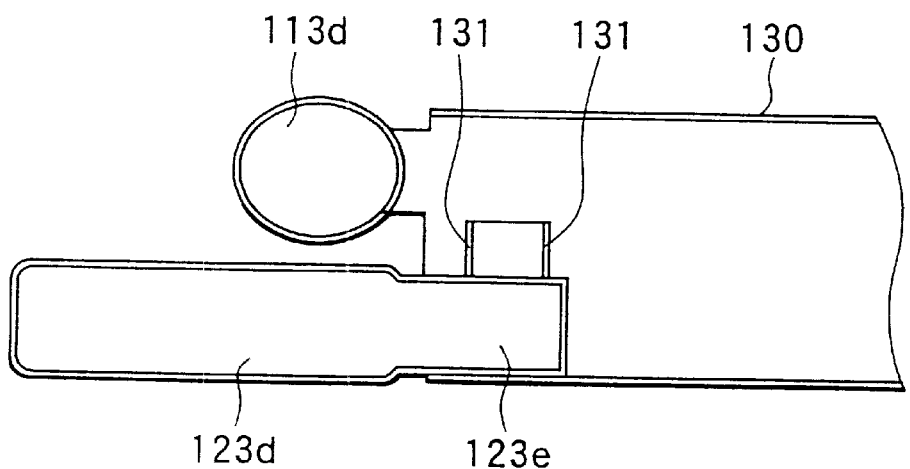
FIG. 12 is a partial top view of the compound heat exchanger as a sixth embodiment of the present invention, showing a portion including header tank caps and a side plate.

A sixth embodiment is shown in FIG. 12. The side plate 130 and the condenser header tank cap 113d are formed as an integral part, and the radiator header tank cap 123d is formed separately. The radiator header tank cap 123d is connected to the integral part by brazing. The positioning walls 131 formed on the side plate 130 correctly position the radiator header tank cap 123d on the side plate 130. Direct heat transfer form the radiator header tanks 123, 124 to the condenser header tanks 113, 114 are prevented in this structure, too. All the header tanks and the caps can be connected together at their correct positions by brazing. Instead of forming the condenser header tank cap 113d and the side plate 130 as an integral part, the radiator header tank cap 123d and the side plate 130 may be made as an integral part, and a separately made condenser header tank cap 113d may be connected to the integral part by brazing.

Though a common side plate 130 supports both the condenser core 110 and the radiator core 120 in all the embodiments described above, it is also possible to make two separate side plates for respective cores 110, 120 and to connect those two side plates together by brazing. Also, two separate side plates may be connected to the bracket for mounting both cores 110, 120 on the vehicle.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A compound heat exchanger comprising:
    a first heat exchanger comprising a plurality of first tubes, a pair of first header tanks connected to both ends of the first tubes, and a plurality of first fins connected between the first tubes, heat being exchanged between a first fluid contained in the first heat exchanger and cooling air blown to the first heat exchanger;
    a second heat exchanger comprising a plurality of second tubes, a pair of second header tanks connected to both ends of the second tubes, and a plurality of second fins connected between the second tubes, heat being exchanged between a second fluid contained in the second heat exchanger and cooling air blown to the second heat exchanger; and
    a side plate connecting the first and the second heat exchangers so that both heat exchangers are overlapped on each other in a flow direction of the cooling air, wherein:
        each of the pair of first header tanks includes a first tank cap closing a longitudinal end of the first header tank;
        each of the second header tanks includes a second tank cap closing a longitudinal end of the second header tank;
        at least one of the first and the second fins is connected to the side plate in heat conductive relation;
        at least one of the first and second tank caps is connected to the side plate in heat conductive relation;
        the side plate includes side walls formed at both sides along a longitudinal direction thereof and bent toward a direction opposite to the fins connected to the side plate and positioning walls formed at a center portion of the side plate;
        each tank cap includes a connecting portion extending therefrom; and
        the connecting portion is inserted and held between the side wall and the positioning wall of the side plate, and the tank cap is connected to the side plate by brazing.

2. The compound heat exchanger as in claim 1, wherein:
    the first heat exchanger is a condenser for cooling refrigerant circulating in an air conditioning system; and
    the second heat exchanger is a radiator for cooling coolant for an internal combustion engine.

3. The compound heat exchanger as in claim 1, wherein:
    each of the pair of first header tanks and each of the pair of second header tanks is formed by connecting two elongate components.

4. The compound heat exchanger as in claim 1, wherein:
    the first fins and the second fins form a plurality of pairs, each pair being integrally formed as a unitary part.

5. The compound heat exchanger as in claim 1, wherein:
    the positioning walls correctly position the first and the second tank caps on the side plate.

6. The compound heat exchanger as in claim 1, wherein:
    each of the first and the second tank caps includes a connecting portion extending toward the side plate; and
    the connecting portion is connected to the side plate.

7. The compound heat exchanger as in claim 1, wherein:
    both of the first and second tank caps are connected to the side plate in heat conductive relation.

* * * * *